US007981397B2

(12) United States Patent
Xu

(10) Patent No.: US 7,981,397 B2
(45) Date of Patent: Jul. 19, 2011

(54) PARTIAL OXIDATION OF HYDROCARBONS

(76) Inventor: Bang-Cheng Xu, Houston, TX (US)

( * ) Notice: Subject to any disclaimer, the term of this patent is extended or adjusted under 35 U.S.C. 154(b) by 253 days.

(21) Appl. No.: 11/881,277

(22) Filed: Jul. 26, 2007

(65) Prior Publication Data

US 2009/0026420 A1    Jan. 29, 2009

(51) Int. Cl.
*C01B 3/28* (2006.01)
*C01B 3/24* (2006.01)
(52) U.S. Cl. ........................................ 423/650
(58) Field of Classification Search .................. 252/373
See application file for complete search history.

(56) References Cited

U.S. PATENT DOCUMENTS

| 5,653,774 | A  * | 8/1997 | Bhattacharyya et al. .... 48/198.7 |
| 7,230,035 | B2 * | 6/2007 | Espinoza et al. .............. 518/703 |
| 2003/0083198 | A1 | 5/2003 | Xu et al. |
| 2004/0076562 | A1 | 4/2004 | Manzanec et al. |
| 2006/0143980 | A1 | 7/2006 | Rapier et al. |

* cited by examiner

*Primary Examiner* — Melvin C Mayes
*Assistant Examiner* — Kenneth Vaden
(74) *Attorney, Agent, or Firm* — Beem Patent Law Firm

(57) ABSTRACT

A process of catalytic partial oxidation of hydrocarbons, particularly methane and/or natural gas to form a product containing hydrogen and carbon monoxide where the first catalyst at the inlet has a higher thermal conductivity than that of a second catalyst closer to the outlet. The second catalyst closer to the outlet has a higher surface area than that of the first catalyst at the inlet.

22 Claims, 1 Drawing Sheet

REACTOR CONFIGRATION

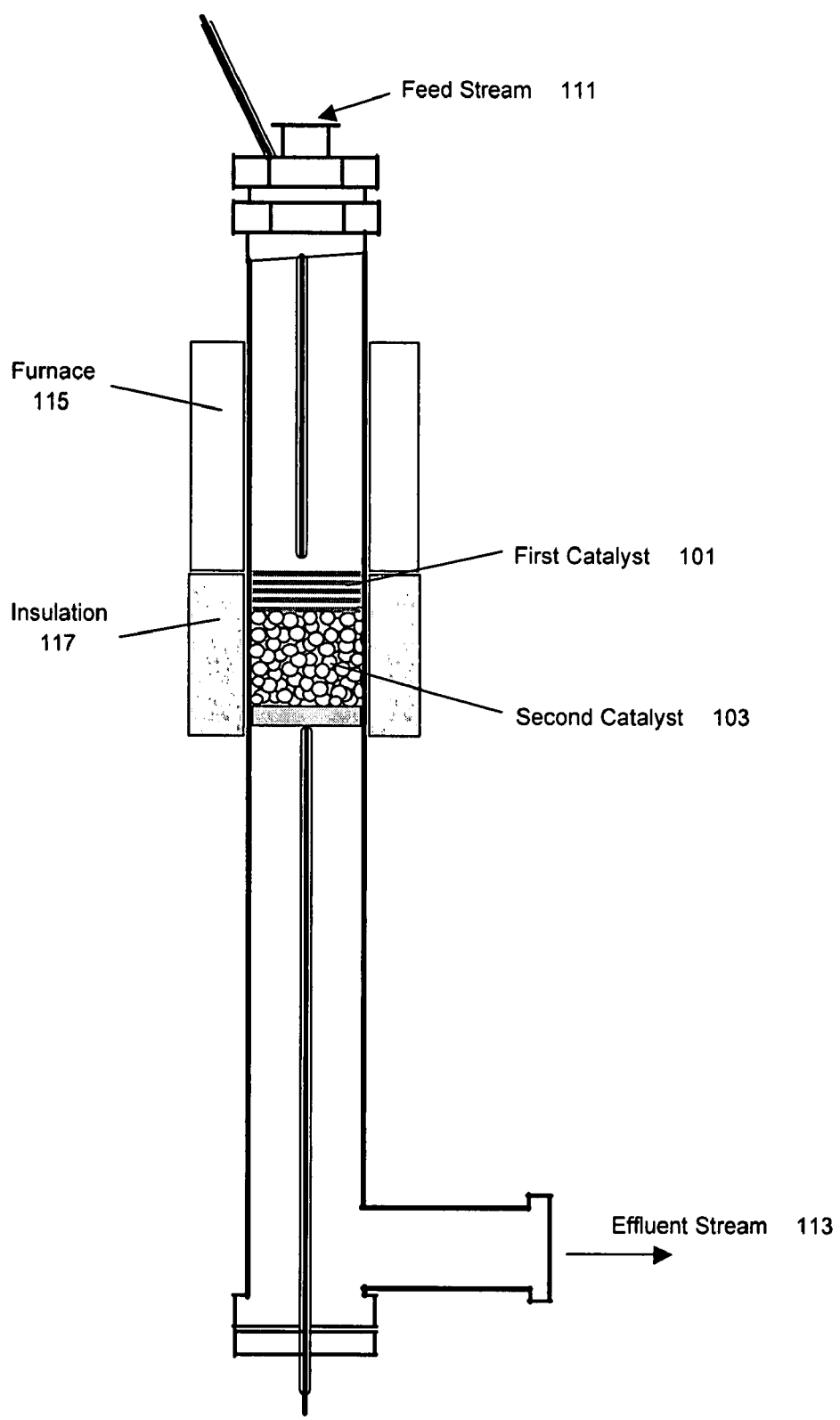
FIG 1  REACTOR CONFIGRATION

PARTIAL OXIDATION OF HYDROCARBONS

FIELD OF THE INVENTION

The present invention generally relates to catalytic partial oxidations of hydrocarbons to produce a product mixture comprising hydrogen and carbon monoxide.

BACKGROUND OF THE INVENTION

Oil production is quickly reaching its peak and it is expected that natural gas will increasingly become the starting material of choice for energy production and/or feedstock for industrial chemical processes. Usually natural gas, which comprises mostly methane, is converted to synthesis gas (used hereinafter interchangeably as "syngas") first. Syngas generally refers to a mixture of carbon monoxide and hydrogen. Syngas then is converted to different products in subsequent reaction or reactions.

Steam reforming has been the most commonly practiced commercial process for making syngas in the natural gas industry for many years. This reforming reaction is highly endothermic and requires heat input. The resultant of 3:1 $H_2$ to CO molar ratio syngas is not ideally suitable for methanol synthesis or Fischer-Tropsch reactions producing various hydrocarbon liquids. A stoichiometric equation of steam reforming of methane is shown below as equation (I):

$$CH_4 + H_2O = CO + 3H_2 \tag{I}$$

On the other hand, a partial oxidation reaction of methane is mildly exothermic ($\Delta H°_{298} = -8.5$ kcal). The resultant of 2:1 $H_2$ to CO molar ratio syngas according to the equation (II) below produces the ideal stoichiometry for methanol synthesis or Fischer-Tropsch reactions.

$$CH_4 + 0.5O_2 = CO + 2H_2 \tag{II}$$

The research on light hydrocarbon such as methane catalytic partial oxidation to make syngas has drawn greater attention since the early 1990s. Precious metals supported on porous ceramic monoliths or particulate solids as carriers are widely used as catalysts for carrying out such a partial oxidation reaction. In addition to the desired partial oxidation reaction, there are many side reactions. One of them is complete oxidation of methane as shown below. The complete oxidation reaction of methane or other hydrocarbons is much more exothermic than the desired partial oxidation reaction, thus releasing more heat.

$$CH_4 + 2O_2 = 2H_2O + CO_2 \tag{III}$$

There are always some amounts of the byproducts $H_2O$ and $CO_2$ along with the desired partial oxidation products $H_2$ and CO. Since there is also some unreacted $CH_4$ in the product stream, certain reforming reactions such as (IV) and (V) below are a possible side reactions in the reactor.

$$CH_4 + H_2O = CO + 3H_2 \tag{IV}$$

$$CH_4 + CO_2 = 2CO + 2H_2 \tag{V}$$

Because of the existence of the more exothermic complete methane (or other hydrocarbons) oxidation reaction, a high temperature hot area/zone is formed at top or front of the catalyst bed. It is commonly observed that the temperature rise in the hot area/zone is much higher than the partial oxidation adiabatic temperature as predicted by calculations or modeling. The high temperature rise may cause damages to the catalyst as the rate of catalyst deactivation increases with temperature. After the top layer catalyst is deactivated, the hot area/zone moves down along the catalyst bed. Consequently, it is typically observed in an experiment that the reaction system outlet temperature increases and the conversion and selectivity decrease with time.

On the other hand, the reforming reactions are strongly endothermic. As a result, the temperature along the catalyst bed in a reactor or reaction system decreases rather quickly and requires heat or thermal input to maintain the reaction rate. At high temperatures, the reforming reactions are very fast. The reforming reaction even can be very fast in gas phase without catalyst. But at low temperatures, the reforming slows down substantially. According to examples in patent application WO0132556, 90% to 95% of the oxygen is consumed in a very thin reaction zone in the front, less than three particle diameters from the catalyst bed inlet. The particle size in the above patent example is in the range of 192 to 450 microns and the catalyst bed length is 10 mm. For a length of only three particles, the depth of the catalyst bed used for oxidation is only a small potion of the entire catalyst bed. Therefore, only reforming reactions take place in the rest of the catalyst bed.

It is therefore desirable to have a catalytic partial oxidation reaction process which can (a) reduce the initial complete oxidation of hydrocarbon feed, such as methane, and/or natural gas and/or other organic compound mixtures to reduce the temperature rise in the front of the reactor or reaction system and at the same time and/or (b) maintain as high as possible a temperature in the rest of the reactor or reaction system in order to maintain a reasonable reaction rate for reforming reactions to convert undesirable complete oxidation products, water and $CO_2$, to form additional synthesis gas—hydrogen and CO.

SUMMARY OF THE INVENTION

The present invention relates to a catalytic partial oxidation process which comprises passing a feed stream through at least a first reaction zone and subsequently a second reaction zone, wherein the first reaction zone containing a first catalyst, the first catalyst comprises a first material in a first shape selected from the group consisting of porous foam, gauze, mesh, honeycomb, monolith, cloth, wire, pellet, trilobe, ring, extrudate, sphere, bead, particulate, granule, and mixtures thereof, and the first material comprises at least one first metal supported on at least one low surface area carrier with a first surface area less than about 1.0 square meter per gram ($m^2/g$) and a first thermal conductivity; and the second reaction zone containing a second catalyst having a second surface area and a second thermal conductivity, the second catalyst comprises a second metal supported on a high surface area carrier to produce an effluent stream comprising carbon monoxide and hydrogen; wherein the feed stream comprises (a) a hydrocarbon feedstock, and (b) oxygen or an oxygen containing mixture; wherein the first surface area of the first catalyst is lower than the second surface area of the second catalyst; and wherein the first thermal conductivity of the first catalyst is higher than the second thermal conductivity of the second catalyst.

Another embodiment of the present invention relates to a catalytic partial oxidation process wherein the first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof; and wherein the first metal is in a form selected from the group consisting of reduced forms of one or more metals, oxidized forms of one or more metals, one or more alloys, and mixtures thereof; and/or the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof; and/or the second catalyst further comprises a promoter metal selected from the group consisting of lanthanum, cerium, gadolinium, praseodymium, neodymium, dysprosium, holmium, ytterbium, samarium europium, erbium, terbium, lutetium, thorium, uranium, and mixtures thereof.

A further aspect of the present invention relates to a catalytic partial oxidation process wherein a side feed component is added between the first catalyst and the second catalyst wherein the feed component is selected from the group consisting of a recycle gas, steam, hydrogen, carbon dioxide, carbon monoxide, methane, and mixtures thereof.

Another embodiment of the present invention is that the conversion of a hydrocarbon, including but not limited to methane, in a process according to the instant invention is at least 50%, preferably at least about 60%, more preferably at least about 70%, and most preferably at least 75%.

Another aspect of the present invention involves a catalytic process wherein the space velocity for the two catalysts is in the range of from about 1,000 to about 10,000,000 NL/kg/h, preferably from about 10,000 to about 1,000,000 NL/kg/h.

A further aspect of the present invention involves a process wherein the high surface area carrier is selected from the group consisting of one or more refractory metal oxides, one or more rare earth modified refractory metal oxides, one or more alkaline earth metal modified refractory metal oxides, and mixtures thereof; and/or the high surface area carrier is selected from the shape of sphere, pellet, trilobe, particulate, bead, ring, granule, and mixtures thereof; and/or the metal of the high surface area carrier is selected from the group consisting of oxides of aluminum, zirconium, magnesium, titanium, silicon, lanthanum, cerium, gadolinium, praseodymium, neodymium, dysprosium, holmium, ytterbium, samarium europium, erbium, terbium, lutetium, thorium, uranium, and mixtures thereof.

Another embodiment of the present invention involves a catalytic hydrocarbon partial oxidation process, wherein the first metal, preferably a precious metal, of the first catalyst is coated, electroplated, diffusingly coated, or otherwise deposited onto the low surface area carrier which comprises one or more other metallic substances with a high thermal conductivity.

Yet another aspect of the present invention relates to a catalytic partial oxidation process, wherein process comprises passing a feed stream through at least a first reaction zone and subsequently a second reaction zone, wherein the first reaction zone containing a first catalyst, the first catalyst comprises a first material in a first shape selected from the group consisting of porous foam, gauze, mesh, honeycomb, monolith, cloth, wire, pellet, trilobe, ring, extrudate, sphere, particulate, bead, granule, and mixtures thereof, and a first thermal conductivity; and the second reaction zone containing a second catalyst having a second surface area and a second thermal conductivity, the second catalyst comprises a second metal supported on a high surface area carrier to produce an effluent stream comprising carbon monoxide and hydrogen; wherein the feed stream comprises (a) a hydrocarbon feedstock, and (b) oxygen or an oxygen containing mixture; wherein the first surface area of the first catalyst is lower than the second surface area of the second catalyst; and wherein the first thermal conductivity of the first catalyst is higher than the second thermal conductivity of the second catalyst; the first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof and wherein the first metal is in a form selected from the group consisting of reduced forms of one or more metals, oxidized forms of one or more metals, one or more metal alloys, and mixtures thereof; the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof; the high surface area carrier is selected from the group consisting of one or more refractory metal oxides, one or more rare earth modified refractory metal oxides, one or more alkaline earth metal modified refractory metal oxides, and mixtures thereof; the high surface area carrier is selected from the shape of sphere, pellet, trilobe, particulate, bead, ring, granule, and mixtures thereof; the promoter metal is selected from the group consisting of lanthanum, cerium, gadolinium, praseodymium, neodymium, dysprosium, holmium, ytterbium, samarium europium, erbium, terbium, lutetium, thorium, uranium, and mixtures thereof; the space velocity is in the range of from about 10,000 to about 1,000,000 NL/kg/h; the inlet temperature is in the range of from about 250° C. to about 450° C.; the pressure is in the range of from about 101 kPa to about 7500 kPa; atomic ratio of carbon of the feed stream to oxygen is in the range of from about 1.7:1 to about 2.3:1; and a side feed component is added optionally between the first catalyst and the second catalyst, and wherein the feed component is selected from the group consisting of a a recycle gas, steam, hydrogen, carbon dioxide, carbon monoxide, methane, and mixtures thereof.

BRIEF DESCRIPTION OF THE DRAWING

FIG. 1 is a schematic drawing of a catalytic reactor made of stainless steel suitable for laboratory scale tests of the catalysts of the preferred combination. The metal gauze catalyst is used at the catalyst top as the first metal catalyst. The second high surface area carrier supported porous catalyst follows the metal gauze catalyst to give large reaction surface.

DETAILS OF THE INVENTION

From analytical and experimental results in converting hydrocarbons to syngas, partial oxidation reactions and other high exothermic undesirable side oxidation reactions to form $H_2O$ and $CO_2$ appear to happen at or near the top (inlet) of catalyst bed while reforming reactions take place later, following these oxidation reactions. Thus, it is desirable that there be at least two reactors or two catalyst beds. The first reaction zone contains a first catalyst, which comprises a first material in a certain shape to be discussed in more detail later herein.

The first reactor with unsupported metal catalyst catalyzes primarily hydrocarbon oxidation reactions and possibly part of the reforming reaction at a high temperature. The second reactor with metal on porous carrier to carry out the reforming reaction is typically operated at a lower temperature. As discussed in more detail later, the two reactors and/or catalyst beds can be separated and a recycled gas, such as byproduct stream, can be added between these two reactors or two beds. Steam or $CO_2$ also can be added into the system between two reactors or two beds to adjust the $H_2$ to CO ratio. The two reactors also can be put in the same vessel with or without distance or other materials/substances, inert or otherwise, in between.

It is within the scope of the present invention that there are various inventive ways to improve the first catalyst if an unsupported porous foam, gauze, mesh, honeycomb, monolith, cloth, wire, pellet, trilobe, ring, extrudate, sphere, bead, particulate, granule, and mixtures is not used. The first catalyst material comprises at least one first metal supported on at least one low surface area carrier with a first surface area less than about 1.0 square meter per gram ($m^2/g$) and a first thermal conductivity. For example, the catalyst on the top of the catalyst bed could be loaded with a large amount of metal to fill the pore, since the internal surface is not useful at the top and the heat conductivity could be increased with the pore full of metal. The metal fill amount in the catalyst could be reduced along the catalyst bed to increase the internal surface for the slower reforming reaction down the catalyst bed.

The first catalyst used in the first bed for partial/complete hydrocarbon oxidation reaction is preferably a metal, such as one or more precious metals, supported on a low-surface area carrier with a first surface area less than about 1.0 square meter per gram ($m^2/g$) and a first thermal conductivity. Precious metals such as Re, Rh, Pt can be coated, electroplated, diffusingly coated, or otherwise deposited onto cheaper metals such as Ni, Co, Al, Cu and mixtures thereof in a first shape selected from the group consisting of porous foam, gauze, mesh, honeycomb, monolith, cloth, wire, pellet, trilobe, ring, extrudate, sphere, bead, particulate, granule to reduce the catalyst cost. These precious metal(s) can also form metal alloys on the surface of such other cheaper metals.

There are various ways to improve the porous carrier catalyst if unsupported metal gauze or monolith is not used. The first catalyst on the top or beginning of the catalyst bed could be loaded with a suitable amount of a filler metal to fill the pore to increase the heat and thermal conductivity. The metal fill amount in the first catalyst could be reduced along the catalyst bed to increase the internal surface for the slower reforming reaction further down into the catalyst bed.

In other words, to reduce the usage of the first metal, it is also within the scope of the present invention that the first metal is coated on one or more other metallic substances. It is preferred that such one or more metallic substances also possess high thermal conductivities. A suitable metallic substance includes, but is not limited to, nickel, cobalt, aluminum, copper, alloys thereof and mixtures thereof. Other metallic substances can also be used provided that they exhibit good thermal conductivity and mechanical strength and that they do not interfere substantially with the desired catalytic partial oxidation reaction of the present invention to produce synthesis gas and/or other desired mixtures comprising carbon monoxide and hydrogen. One example is that the material or carrier itself is made of one or more such metallic substances.

As discussed, many metals are suitable for the present invention as the first metal for the first catalyst. For the present invention, a suitable first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof. A preferred first metal is selected from the group consisting of nickel, ruthenium, rhodium, palladium, iridium, tungsten, alloys thereof, and mixtures thereof.

In addition, the first metal of the first catalyst can be present in various forms—metallic state, reduced forms, oxidized forms, hydrides, sulfides, alloys, complexes, and mixtures thereof.

Some examples of a second metal in the second reaction zone suitable for the present invention are selected from, but are not limited to, the group consisting of iron, cobalt, nickel, ruthenium, rhodium, palladium, osmium, iridium, platinum, lanthanides such as lanthanum, cerium, gadolinium, praseodymium, neodymium, dysprosium, holmium, ytterbium, samarium europium, erbium, terbium, lutetium, actinides such as thorium, uranium, and mixtures thereof. Preferred second metal includes, but is not limited to cobalt, nickel, ruthenium, rhodium, palladium, osmium, iridium, platinum.

Carriers suitable for the second catalyst of the present invention include, but are not limited to those compounds with high surface areas, particularly high internal surface areas. Preferred carriers include, but are not limited to one or more refractory metal oxides, one or more rare earth metal modified refractory metal oxides, one or more alkaline earth metal modified refractory metal oxides, and mixtures thereof. Examples of such metals for these metal oxides are selected from the group consisting of beryllium, magnesium, calcium, strontium, barium, boron, aluminum, zirconium, titanium, silicon, lanthanum, cerium, gadolinium, praseodymium, neodymium, dysprosium, holmium, ytterbium, samarium europium, erbium, terbium, lutetium, thorium, uranium, and mixtures thereof.

The high surface area carrier of the second catalyst has a substantially stable surface area under reaction conditions. The term "substantially stable" within this invention means that the loss of surface area under prevailing reaction conditions over time is less than 2% per hour.

It is also a preferred embodiment of the present invention that the thermal conductivity of the first catalyst is higher than the thermal conductivity of the second catalyst and subsequent catalysts, if there are any in the reaction system. In terms of thermal conductivity, it is within the scope of the present invention that the thermal conductivity of the first catalyst is at least 0.05 $cal/cm^2/cm/second/^\circ C$. It is more preferred that the thermal conductivity is at least 0.10 $cal/cm^2/cm/second/^\circ C$. It is more preferred that the thermal conductivity is at least 0.15 $cal/cm^2/cm/second/^\circ C$.

The feed stream comprises a mixture of a hydrocarbon feedstock and an oxidizing agent. The mixture can be made as a single feed; or alternatively, the hydrocarbon feedstock and the oxidizing agent can be mixed prior to being introduced into the reaction zone.

The hydrocarbon feedstock can be selected from various compounds such as $C_1$ to $C_{10}$ organic compounds, including, but not limited to methane, ethane, propane, butanes, pentanes, hexanes, heptanes, octanes, nonanes, decanes, and mixtures thereof. Unsaturated hydrocarbons can be present, and/or used alone or in conjunction with saturated hydrocarbons too. Examples include, but are not limited to ethylene, acetylene, propylene, propyne, allene, $C_4$ to $C_{10}$ unsaturated compounds such as butene-1, butyne-1, and others, and mixtures thereof. Other heteroatom-containing compounds can be present in the hydrocarbon feedstock too. Examples include, but are not limited to CO, $CO_2$, methanol, methylamine, formaldehyde, formic acid, ethanol, acetaldehyde, acetic acid, other similar oxygen or nitrogen containing compounds, and mixtures thereof. Heavier hydrocarbons can be present in the hydrocarbon feedstock too. But it is preferred that they are present in small quantities to avoid excessive catalyst deactivation.

Light hydrocarbons, $C_1$-$C_5$ saturated or unsaturated compounds and/or their mixtures are preferred. For the present invention, it is more preferred to use a hydrocarbon feedstock comprising methane, or ethane, or propane, or butanes, and/ or mixtures thereof. So-called natural gas and liquefied natural gas also are more preferred. They comprise primarily methane, ethane, propane and some other hydrocarbons in small quantities. When single hydrocarbon is used, a feed consists essentially of methane is most preferred. As already stated, if there is a recycle of certain product streams in the catalytic partial oxidation process of the present invention, some oxygen-containing compounds such as CO, $CO_2$, methanol, formaldehyde, formic acid, and others may also be present. The amounts would depend on the proportion of the recycle stream relative to the fresh feed.

While many different oxidizing agents can be used, it is preferred to use oxygen, air, other compositions containing oxygen, and mixtures thereof. The concentration of oxygen in the total feed stream is in the range of from about 0.01 vol % to about 50 vol %, preferably from about 0.1 vol % to about 35 vol %. Depending on the hydrocarbon feedstock, it is preferred to use oxygen concentrations outside the so-called flammable region to minimize operational risks.

Carbon to oxygen ratios are from about 1:1 to about 3.3:1, more preferably, from about 1.3:1 to about 2.5:1, and most preferably from about 1.7:1 to 2.3:1.

It is also within the scope of the present invention that a side feed component is added to the reaction system between the first and the second catalyst. A suitable side feed component comprises one or more of the elements selected from, but not limited to, a recycle gas, steam, hydrogen, carbon dioxide, carbon monoxide, methane, ethane, methanol, formaldehyde, formic acid, and mixtures thereof.

As discussed, at least two different catalysts are used for the present invention to catalytically and partially oxidize the hydrocarbon feedstock to produce an effluent stream. The effluent stream comprises carbon monoxide and hydrogen. As already stated above and depending on the process conditions and feedstock compositions, there may be other by-products and/or co-products in the effluent stream, such as carbon dioxide, water, methanol, formaldehyde, formic acid, and others.

It is preferred that at least two catalysts are present in a reactor or a reaction system in series. There are many different ways to accomplish this arrangement for the present invention. One way is to have the catalyst stacked in the reactor, with or without any space or other materials or piping between the catalyst layers. The reactor can be placed vertically, horizontally, or in any other suitable angle, arrangements, or combinations thereof known to those skilled in the art. It is also within the scope of the present invention to have two or more catalysts (as a non-exclusive example) mixed to form a gradient—100% of the first catalyst in the front, decreasing amounts of the first catalyst and increasing of the second catalyst along the reactor and finally 100% of the second catalyst in the backend of the reactor.

The feed stream is initially contacted with a first catalyst in the front under selected and appropriate reaction conditions. The first catalyst comprises a material, which has a shape of porous foam, gauze, mesh, honeycomb, wheel, monolith, mixtures thereof and other suitable forms. The material itself may be made of a first metal. Or, this material is loaded with a first metal for the first catalyst.

The catalytic partial oxidation reaction can be carried out under a variety of reaction conditions. The conditions are selected and adjusted in accordance with the feed stream selected, the hydrocarbon selected, the oxidizing agent selected, the first catalyst selected, the second catalyst selected, other catalyst(s) selected, the manner in which the catalysts are configured, the reactor type, the desired synthesis gas composition (Hydrogen to carbon monoxide ratio), whether any products or byproducts will be recycled, and others.

Generally, a flow rate, measured as space velocity, suitable for the present invention is in the range of from about 1,000 to about 10,000,000 NL/Kg/Hr (normal liters per kilograms of catalyst per hour), preferably from about 10,000 to about 1,000,000 NL/Kg/Hr, and more preferably from about 50,000 to about 500,000 NL/Kg/Hr. The flow rate can be adjusted to achieve the desired conversion, selectivity and catalyst life of the catalytic partial oxidation.

For the present invention, an inlet temperature in the range of from about 15° C. to about 750° C. is considered suitable. The range is preferred to be in the range of from about 150 to about 550° C., more preferably from about 250° C. to about 450° C.

It is found that the catalyst degrades faster when the reactor is operated under pressure. At the high-pressure condition, the reactant density is higher and the heat generation per unit (weight or volume or other suitable measurements) catalyst is also higher. The porous catalyst carrier with poor heat (thermal) conductivity and high heat resistance cannot sustain the severe conditions and the active first (or catalytic active) metal is sintered at a faster rate than the rate of sintering for a reaction operated at lower pressures.

The equilibrium conversion of the catalytic partial oxidation reaction changes with operating pressure. As a general rule, side reactions increase, hydrocarbon conversion, product selectivity, and catalyst life decreases as the pressure in the reactor increases. Pressure is in the range of from about 101 kPa to about 7,500 kPa; preferably from about 600 kPa to about 3500 kPa; and more preferably from about 1,200 kPa to about 2,500 kPa. The pressure can be adjusted as the reaction proceeds to obtain the desired reaction results.

Another aspect of the current invention relates to recycling of certain by-products or products back to the reaction system at a point between the inlet and the outlet. If two catalysts, a first catalyst and a second catalyst, are used, a preferred point of injecting the recycle stream is somewhere between the two catalyst beds.

Another aspect of the current invention relates to fuel cell. Steam is introduced in to the reactor between the two catalyst beds to do water gas shifting reaction to convert CO in syngas to $H_2$.

The conversion of a hydrocarbon, such as methane, in a process according to the instant invention is at least 50%, preferably at least about 60%, more preferably at least about 70%, and most preferably at least 75%.

Selectivity to $H_2$ is preferred to be at least 65 mol %, more preferably at least about 75 mol %, most preferably at least 85 mol %; and selectivity to CO is preferred to be least 65 mol %, more preferably at least about 75 mol %, most preferably at least 85 mol %.

EXAMAPLE 1

Invention

A 20 millimeter diameter and 5 millimeter thick Ni gauze with 60 mesh was used as the first catalyst in the first reaction zone. A 10 millimeter thick porous carrier supported Ni catalyst with 13% Ni and 12% La was used as the second catalyst in the second reaction zone. A feed mixture containing 67 vol % methane and 33 vol % oxygen (The feed is in the flammability range. But with good mixer, there is no problem. The higher inlet temperature can get more reforming and thus higher CH4 conversion and CO and H2 selectivity. The problem for higher inlet temperature is easier to get pre-ignition before the mixed gas contacting the catalyst.) was passed through the reactor containing above catalyst at a space velocity of 46,000 per hour. Methane conversion 86.1%, CO selectivity 84.1%, $H_2$ selectivity 99.9%, inlet temperature 235° C., Outlet temperature 920° C.

EXAMAPLE 2

Invention

A 20 millimeter diameter and 3 millimeter thick Rh gauze with 80 mesh was used as the first catalyst in the first reaction zone. A 10 millimeter thick porous carrier supported Rh catalyst with 4% Rh and 8% La was used as the second catalyst in the second reaction zone. A feed mixture containing 67 vol % methane and 33 vol % oxygen was passed through the reactor containing above catalyst at a space velocity of 128,000 per hour. Methane conversion 96.1%, CO selectivity 95.6%, $H_2$ selectivity 96.4%, inlet temperature 235° C., Outlet temperature 875° C.

The examples described above are for illustration purpose only. They are not intended, and should not be interpreted, to limit either the scope or the spirit of this invention. Those skilled in the art would appreciate that many other variations or substitutes can be used as equivalents for the purposes of this invention, which is defined solely by the written description and the claims.

I claim:

1. A catalytic partial oxidation process, said process comprises passing a feed stream through a reactor having at least a first reaction zone and subsequently a second reaction zone, wherein
   the first reaction zone containing a first catalyst having a first surface area and a first thermal conductivity, the first catalyst comprising a first metal in reduced form or oxidized form or in an alloy and either being supported on a first carrier or unsupported,
   wherein, if supported, said first carrier comprises one or more metallic substances with a high thermal conductivity and the first metal is electroplated or diffusingly coated on the first catalyst carrier, wherein the first surface area is less than about 1.0 square meter per gram ($m^2/g$); and
   the second reaction zone contains a second catalyst having a second surface area and a second thermal conductivity, the second catalyst comprising a second metal supported on a carrier to produce an effluent stream comprising carbon monoxide and hydrogen;
   wherein the feed stream comprises (a) a hydrocarbon feedstock, and (b) oxygen or an oxygen containing mixture;
   wherein the first surface area of the first catalyst is lower than the second surface area of the second catalyst;
   wherein the first thermal conductivity of the first catalyst is at least 0.05 $cal/cm^2/cm/second/°$ C. at operating temperatures;
   wherein the first thermal conductivity of the first catalyst is higher than the second thermal conductivity of the second catalyst; and
wherein a pressure in said reactor is between about 600 kPa and about 7,500 kPa.

2. The catalytic partial oxidation process of claim 1, wherein the first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof.

3. The catalytic partial oxidation process of claim 1, wherein the first thermal conductivity of the first catalyst is at least 0.10 $cal/cm^2/cm/second/°$ C.

4. The catalytic partial oxidation process of claim 1, wherein the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof.

5. The catalytic partial oxidation process of claim 1, wherein the second catalyst further comprises a promoter metal selected from the group consisting of lanthanum, cerium, gadolinium, praseodymium, neodymium, dysprosium, holmium, ytterbium, samarium europium, erbium, terbium, lutetium, thorium, uranium, and mixtures thereof.

6. The catalytic partial oxidation process of claim 1, wherein a side feed component is added between the first reaction zone and the second reaction zone, and wherein the feed component is selected from the group consisting of a recycle gas, steam, hydrogen, carbon dioxide, carbon monoxide, methane, and mixtures thereof.

7. The catalytic partial oxidation process of claim 1, wherein the feed stream has a space velocity in the range of from about 1,000 to about 10,000,000 NL/kg/h.

8. The catalytic partial oxidation process of claim 7, wherein the space velocity for the two catalysts is in the range of from about 10,000 to 1,000,000 NL/kg/h.

9. The catalytic partial oxidation process of claim 1, wherein the carrier of the second catalyst has a substantially stable surface area under reaction conditions.

10. The catalytic partial oxidation process of claim 1, wherein the carrier of the second catalyst is selected from the group consisting of one or more refractory metal oxides, one or more rare earth modified refractory metal oxides, one or more alkaline earth metal modified refractory metal oxides, and mixtures thereof.

11. The catalytic partial oxidation process of claim 9, wherein the carrier of the second catalyst is in a shape selected from the group consisting of sphere, pellet, trilobe, particulate, bead, ring, granule, and mixtures thereof.

12. The catalytic partial oxidation process of claim 9, wherein the carrier of the second catalyst comprises an oxide of a metal selected from the group consisting of aluminum, zirconium, magnesium, titanium, silicon, lanthanum, cerium, gadolinium, praseodymium, neodymium, dysprosium, holmium, ytterbium, samarium europium, erbium, terbium, lutetium, thorium, uranium, and mixtures thereof.

13. The catalytic partial oxidation process of claim 9, wherein the second catalyst further comprises a promoter metal selected from the group consisting of lanthanum, cerium, gadolinium, praseodymium, neodymium, dysprosium, holmium, ytterbium, samarium europium, erbium, terbium, lutetium, thorium, uranium, and mixtures thereof.

14. The catalytic partial oxidation process of claim 1, wherein the feed stream has an inlet temperature is in the range of from about 15° C. to about 750° C.

15. The catalytic partial oxidation process of claim 14, wherein the inlet temperature is in the range of from about 250° C. to about 450° C.

16. The catalytic partial oxidation process of claim 1, wherein the feed stream has an atomic ratio of carbon to oxygen in the range of from about 1.7:1 to about 2.3:1.

17. The catalytic partial oxidation process of claim 1, wherein
   the amount of the first metal of the first catalyst is in the range of from about 0.1 wt % to about 100 wt %;

the amount of the second metal of the second catalyst is in the range of from about 0.5 wt % to about 16 wt %; and
the second catalyst further comprises a promoter in the range of from about 2 wt % to about 20 wt %.

18. A catalytic partial oxidation process, said process comprises passing a feed stream through at least a first reaction zone and subsequently a second reaction zone, wherein
the first reaction zone contains a first catalyst having a first surface area and a first thermal conductivity, the first catalyst being supported and comprising a first metal in reduced form or oxidized form or in an alloy, wherein the first surface area is less than about 1.0 square meter per gram (m$^2$/g); and
the second reaction zone contains a second catalyst having a second surface area and a second thermal conductivity, the second catalyst comprising a second metal supported on a carrier to produce an effluent stream comprising carbon monoxide and hydrogen;
wherein the first reaction zone comprises a first catalyst carrier comprising one or more metallic substances with a high thermal conductivity, and the first metal is electroplated or diffusingly coated on the first catalyst carrier;
wherein the feed stream comprises (a) a hydrocarbon feedstock, and (b) oxygen or an oxygen containing mixture;
wherein the first surface area of the first catalyst is lower than the second surface area of the second catalyst;
wherein the first thermal conductivity of the first catalyst is at least 0.05 cal/cm$^2$/cm/second/° C. at operating temperatures; and
wherein the first thermal conductivity of the first catalyst is higher than the second thermal conductivity of the second catalyst;
the first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof;
the second metal is selected from the group consisting of iron, cobalt, nickel, ruthenium, rhodium, palladium, osmium, iridium, platinum, lanthanum, cerium, gadolinium, praseodymium, neodymium, dysprosium, holmium, ytterbium, samarium europium, erbium, terbium, lutetium, thorium, uranium, and mixtures thereof,
the carrier of the second catalyst is selected from the group consisting of one or more refractory metal oxides, one or more rare earth modified refractory metal oxides, one or more alkaline earth metal modified refractory metal oxides, and mixtures thereof;
the carrier of the second catalyst is in a shape selected from the group consisting of sphere, pellet, trilobe, particulate, bead, ring, granule, and mixtures thereof;
the second catalyst further comprises a promoter metal selected from the group consisting of lanthanum, cerium, gadolinium, praseodymium, neodymium, dysprosium, holmium, ytterbium, samarium europium, erbium, terbium, lutetium, thorium, uranium, and mixtures thereof;
the feed stream has a space velocity is in the range of from about 10,000 to about 1,000,000 NL/kg/h;
the inlet temperature is in the range of from about 250° C. to about 450° C.;
the pressure is in the range of from about 600 kPa to about 7,500 kPa;
the feed stream has an atomic ratio of carbon to oxygen in the range of from about 1.7:1 to about 2.3:1; and
a side feed component is added optionally between the first reaction zone and the second reaction zone, and wherein the feed component is selected from the group consisting of a recycle gas, steam, hydrogen, carbon dioxide, carbon monoxide, methane, and mixtures thereof.

19. A catalytic partial oxidation process, said process comprises passing a feed stream through at least a first reaction zone and subsequently a second reaction zone, wherein
the first reaction zone contains a first catalyst having a first surface area and a first thermal conductivity, the first catalyst being unsupported and comprising a first metal in reduced form or oxidized form or in an alloy, wherein the first surface area is less than about 1.0 square meter per gram (m$^2$/g); and
the second reaction zone contains a second catalyst having a second surface area and a second thermal conductivity, the second catalyst comprising a second metal supported on a carrier to produce an effluent stream comprising carbon monoxide and hydrogen;
wherein the feed stream comprises (a) a hydrocarbon feedstock, and (b) oxygen or an oxygen containing mixture;
wherein the first surface area of the first catalyst is lower than the second surface area of the second catalyst;
wherein the first thermal conductivity of the first catalyst is at least 0.05 cal/cm$^2$/cm/second/° C. at operating temperatures; and
wherein the pressure is in the range of from about 600 kPa to about 7,500 kPa; and
wherein the first thermal conductivity of the first catalyst is higher than the second thermal conductivity of the second catalyst.

20. The catalytic partial oxidation process of claim 19, wherein the amount of the first metal in the first catalyst is at least 0.1 wt %;
the amount of the second metal in the second catalyst is in the range of from about 0.5 wt % to about 16 wt %; and
the second catalyst further comprises a promoter in the range of from about 2 wt % to about 20 wt %.

21. The catalytic partial oxidation process of claim 19, wherein the first metal of the first catalyst is selected from the group consisting of iron, cobalt, nickel, ruthenium, rhodium, palladium, osmium, iridium, platinum, titanium, vanadium, chromium, molybdenum, tungsten, alloys thereof, and mixtures thereof.

22. The catalytic partial oxidation process of claim 19, wherein the first thermal conductivity of the first catalyst is at least 0.10 cal/cm$^2$/cm/second/° C.

* * * * *